United States Patent [19]

Thorn

[11] 3,739,176
[45] June 12, 1973

[54] ARRANGEMENT FOR THE CONTROLLED GUIDANCE OF A WORKING MACHINE WITH LASER BEAMS

[75] Inventor: Juergen Thorn, Haar, Germany

[73] Assignee: Siemens Aktiengesellschaft, Berlin and Munich, Germany

[22] Filed: Feb. 22, 1971

[21] Appl. No.: 117,326

[30] Foreign Application Priority Data
Feb. 27, 1970 Germany.................. P 20 09 360.1

[52] U.S. Cl..... 250/203 R, 250/220 M, 331/94.5 A
[51] Int. Cl............................................. G01j 1/20
[58] Field of Search ................. 250/201, 210, 203, 250/202, 215, 217, 234; 356/141, 152, 172; 178/6.8; 331/94.5 R, 94.5 A; 200/61.52; 37/DIG. 20

[56] References Cited
UNITED STATES PATENTS

| | | | |
|---|---|---|---|
| 3,491,969 | 1/1970 | Muldoon | 250/203 R |
| 3,641,351 | 2/1972 | Hintringer | 250/217 SS |
| 3,197,643 | 6/1965 | Morris | 250/220 M |
| 3,486,826 | 12/1969 | Colvin | 356/141 |
| 1,175,062 | 3/1916 | Johnson | 200/61.52 |
| 3,551,057 | 12/1970 | Hamilton | 250/203 |
| 3,364,356 | 1/1968 | Jones | 250/203 |
| 3,439,170 | 4/1969 | Zagone | 250/203 |

Primary Examiner—James W. Lawrence
Assistant Examiner—D. C. Nelms
Attorney—Hill, Sherman, Meroni, Gross & Simpson

[57] ABSTRACT

An apparatus which moves may be simply and accurately controlled to travel generally parallel with a laser beam where the apparatus has connected therewith or mounted thereon a control means including a first and second sensing means which detect any relative movement from a predetermined relationship with the laser beam. Advantageously the control means includes at least first and second sensing means positioned in spaced relation along the laser beam with each producing a separate indication of deviation from the laser beam. In addition a third sensing means may be provided on the apparatus at a point remote from the laser beam to measure rotary movement of said apparatus. It is an important feature of the invention that the laser beam have distinctly measurable horizontal and vertical components and may take the form of a cross. In such case each of the first and second sensing means will include a pair of photoelectric sensors preferably located on opposite sides of each of a horizontal and vertical component of the laser beam at the point of the sensing means.

9 Claims, 2 Drawing Figures

PATENTED JUN 12 1973 3,739,176

INVENTOR
Juergen Thorn

BY ATTYS.

ARRANGEMENT FOR THE CONTROLLED GUIDANCE OF A WORKING MACHINE WITH LASER BEAMS

BACKGROUND OF THE INVENTION

This invention generally relates to laser beam guidance systems and more particularly concerns an arrangement for the controlled guidance of an apparatus or machine which moves substantially in the direction of its longitudinal axis through space. Guidance is effected by a control means mounted on the apparatus and cooperating with a laser beam generally parallel to the apparatus axis to indicate deviations of movement of the apparatus from such predetermined position. By this control means the apparatus position may be adjusted to overcome the indicated deviation and return the apparatus to a predetermined position with respect to the laser beam.

The use of laser beams to control machines which travel through space, such as tunnel-driving machines, rail-straightening machines, and the like has been proposed and in some cases been tried. These prior systems of control by a laser beam have certain significant disadvantages for many applications. Thus, for example, in the control of a tunnel machine with the aid of such a system, it is possible that the machine may be advanced at an angle off the laser beam with respect to the working direction so that although the single measuring point on the machine always lies on a predetermined axis parallel to the laser beam, nevertheless, the axis of the tunneling machine itself may be tilted at an angle to the laser beam. In such cases serious problems may be caused resulting in binding of the machine, an incorrect hole configuration and undue wear and tear on the apparatus. Furthermore, in the case where the tunneling machine has an axis lying parallel to the boring direction, it is possible with the prior devices that there can occur a signal causing an incorrect adjustment if the tunneling machine with the control device fastened to it is merely rotating or twisting about its axis. Thus, the rotary movement could be incorrectly interpreted as a lateral deviation resulting in an incorrect lateral adjustment that would cause the machine to go off course. These problems and other inaccuracies and disadvantages have existed for some time.

SUMMARY OF THE INVENTION

The problems and disadvantages of the prior control devices are overcome by the apparatus guidance system according to the present invention wherein an apparatus having a longitudinal axis may be simply and accurately guided in a predetermined direction generally parallel to a laser beam by a control means mounted on the apparatus and cooperating with the laser beam to indicate deviations of the apparatus axis from its predetermined position with respect to the laser beam. As a solution to the disadvantages of the prior art the present invention includes two sensing means positioned in spaced relation along both the laser beam and the apparatus with each of the sensing means producing a separate indication of deviation from the laser beam.

To avoid the problems in the prior art with a tunneling or boring machine that rotated about its axis, the present invention includes a third sensing means connected with the apparatus for measuring any rotary movement of the apparatus about its longitudinal axis of rotation. Such third sensing means may take the form of a pendulum means pivoted at a point on the longitudinal axis of the apparatus and swinging in a plane generally perpendicular to the apparatus with the movement of the pendulum means being suitably registered.

It is an important feature of this invention that the laser beam have at least one relatively narrow, vertical and horizontal component of a well defined and predetermined width so that sensors on opposite sides of each of the horizontal and vertical laser beam components may detect any relative vertical or horizontal movement therebetween and appropriately signal such movements so that adjustments in the course of the apparatus may be made to return it to its predetermined relationship with the laser beam.

In one advantageous embodiment of the invention, the laser beam is generally in the shape of a cross having well defined horizontal and vertical components or elements crossing each other. These crossed horizontal and vertical elements form left and right horizontal portions on opposite sides of the vertical element and upper and lower vertical portions on opposite sides of the horizontal elements. With each of the first and second sensing means having a separate vertical and horizontal sensor, they may be arranged so that one of each of the horizontal and vertical elements is sensed by one sensing means and the other vertical and horizontal elements are sensed by the other sensing means. As shown the vertical sensor of the first sensing means includes a pair of photoelectric cells on opposite sides of the lower vertical laser beam portion and the horizontal sensor of the first sensing means includes a pair of photoelectric cells on opposite sides of the left horizontal portion. Similarly, the second sensing means vertical sensor would include a pair of photoelectric cells on opposite sides of the upper vertical portion and the horizontal sensor of the second sensing means will sense the upper vertical laser beam portion. In this arrangement the photoelectric cells of each sensing means or photoreceiver set form a "L" with the two L's being inverted with respect to each other to form a substantial rectangle when viewed in a projection parallel to the laser beam axis.

Through the determination of two points spaced in axial direction of the machine and, where necessary, the simultaneous determination of the angular rotation about the apparatus axis, the position of the machine or apparatus in space may be clearly fixed and thereby accurately and dependably controlled.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DESCRIPTION OF A PREFERRED EMBODIMENT

Figure 1:
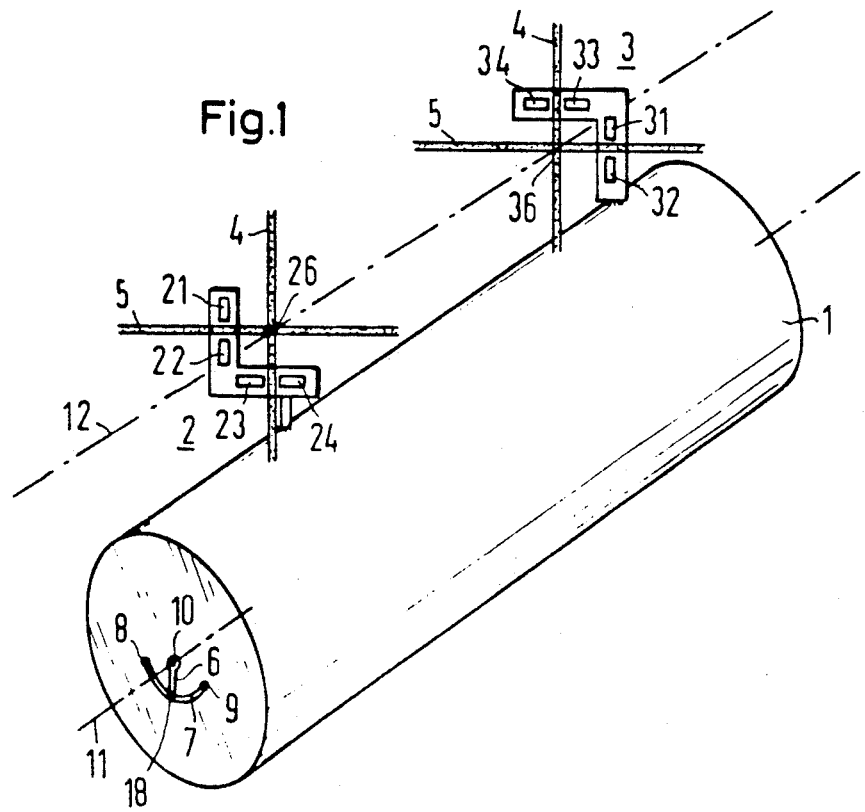
FIG. 1 shows a schematic perspective representation of an apparatus guidance system according to the invention herein.

FIG. 1 represents a schematic illustration of a machine or apparatus 1 having a longitudinal or central axis 11. As shown the axis 11 represents an axis of rotation as well as a predetermined straight line course. A laser fixed in a position (not shown) emits a beam having a vertical planar portion 4 and a horizontal planar portion 5 which intersect each other along an axis 12. This laser beam configuration may be produced with the aid of cylindrical lenses of rotary mirror systems which fan open a beam into planes perpendicular to one another. Although this arrangement will be understood by those skilled in the art, we have found that if, before the beam is fanned open, the beam diameter is widened to a diameter of several centimeters, the refraction-limited parallelism of the beam will be increased. The intersection line 12 of these two laser fan planes 4 and 5 will, in the arrangement herein, lie parallel to the machine axis 11. It will be understood that although I have illustrated the apparatus 1 in FIG. 1 as being solid and the laser beam as being outside the machine, that the laser beam and accompanying control means may of course be inside the diameter of the machine 1 and that the inter-section line 12 may in fact be coextensive with the axis 11.

A control means including a first sensing means 2 and a second sensing means 3 is shown in FIG. 1 as being positioned above the apparatus 1. The control means cooperates with the laser beam to indicate deviation therefrom so that the apparatus position may be adjusted to correct this situation. With the laser beam having at least one vertical component 4 and one horizontal component 5 of predetermined thickness, the first and second sensing means 2 and 3 respectively, spaced along the laser beam have sensor means on opposite sides of each of these horizontal and vertical components 4, 5, whereby relative vertical or horizontal movement therebetween will be detected. Thus, in FIG. 1 the first sensing means 2 may be seen to have a pair of photoelectric cells 21, 22 on opposite sides of the left hand portion of the horizontal component 5 of the laser beam. The first sensing means 2 also includes a pair of photoelectric cells 23, 24 on opposite sides of the lower portion of the vertical component 4 of the laser beam. This L-shaped sensing arrangement may be suitably affixed to the machine or apparatus 1 as schematically indicated in FIG. 1. At a spaced point along the laser beam 12 the second sensing means 3 includes a similar arrangement of photoelectric cells on opposite sides of the horizontal and vertical components, however, in this case photoelectric cells 31, 32 are on opposite sides of the right hand portion of the horizontal component 5 and photoelectric cells 33, 34 are on opposite sides of the upper portion of the vertical component 4. Again the L-shaped support configuration may be used but with the L inverted with respect to the L of the first sensing means. The legs of the L in each case form a right triangle.

Figure 2:
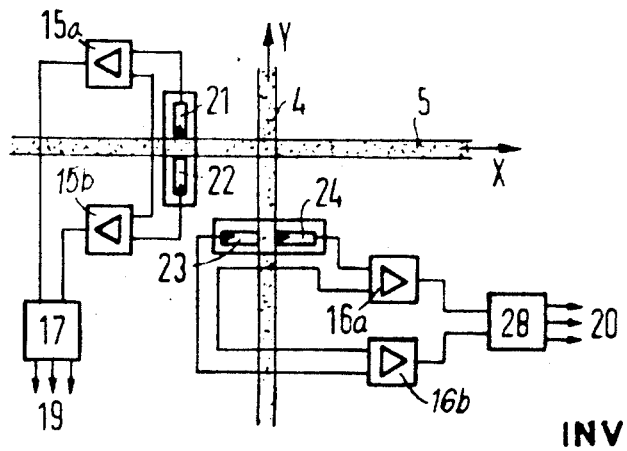
FIG. 2 illustrates a schematic representation of one of the sensing means or photoreceiver arrangements schematically illustrated in FIG. 1.

The first sensing means or photoreceiver device 2 together with its pertinent control members is schematically represented on a larger scale in FIG. 2. It will be there seen that a first amplifier means 15a, 15b, is positioned at the output side of the photocells 21, 22 respectively with each of the portions 15a, 15b inputing into an amplifier control device 17 which is designed to deliver two signals representing an upward or downward deviation of the sensing means 21, 22 in the attached apparatus 1 from the horizontal laser beam component 5. In similar fashion the photoelectric cells 23, 24 feed to an amplifier means 16b, 16a, respectively, which in turn are connected with an amplifier control device 28 which is designed to deliver two signals for the situations where the sensing means 23, 24 in the connected apparatus 1 are "too far to the left" or "too far to the right." An operating contact 19 on the amplifier control device 17 and an operating contact 20 on the amplifier control device 28 serve to deliver the signal in a readily usable form.

If the vertical and horizontal components 4 and 5 of the laser beam lie, as shown, in the drawings, exactly in the middle between the two photoelectric cells of each leg, then a difference stage connected to these two photoelectric cells delivers the output signal of zero, which represents the desired position. The two measuring points on the machine are, accordingly, the intersection points 26 and 36 where the vertical and horizontal components 4, 5 intersect in each case. It will be understood that as a consequence of a deviation of the apparatus 1 from its course, the sensing 2, 3 will be displaced with respect to the fixed laser cross 4, 5 so that the vertical and horizontal components of the displacement cause a corresponding output signal of the difference stage which is connected to the vertical and horizontal photoelectric cells which, as shown in FIG. 2 is suitably amplified and transmitted to the operating contacts 19 and 20 to adjust the course of the apparatus. These output signals of the difference stages, either positive or negative according to the direction of the displacement, can, after a suitable amplification over switching relays, drive the control arrangements of the machine automatically in such a way that the deviation from the predetermined course is corrected and the machine is returned on course.

The photoelectric cells of the first and second sensing means 2, 3 are offset from one another in a manner shown in FIG. 1 in such a way that they form, in projection, substantially a rectangle whereby the first sensing means 2 cannot shade the second sensing means 3 against the laser beam.

Since, in general, it is essential only that the machine move on a prescribed desired axis, the photoelectric cells of the first and second sensing means can be constructed as a simple yes-no receiver. With this yes-no receiver one photocell is fixed on opposite sides of each of the horizontal and vertical components of the laser beam. Each of the photocells act on a difference stage whose output signal is zero only if the pertinent laser component lies exactly in the middle of the two photo elements. If the relative movement between the laser component and the photoelectric cells is such that there is a deviation from this middle point, the output signals give off different polarity, depending upon the direction of movement, which output signals operate through switching relays or the like control devices to cause the difference signals to disappear. In order to assure a quick and clean response of the sensing means, the pairs of photoelectric cells such as 21, 22; 23, 24; 33, 34; 31, 32, should not be spaced too far apart so that in case of a sudden extreme displacement the apparatus may quickly react and avoid the possibility of the laser moving out of the sensitivity range of the photocells before correction may be effected. This possibility may also be excluded by the use of a proportional sensing means in which an elongated photocell has a sensitivity which varies linearly or monotonically in one direction. Such photocell, for example, may be either covered with a wedge-shaped filter or have a width altered in wedge-form or receive impressed thereon a sensitivity profiled by a corresponding doping.

If it is desired to cover greater lateral displacements it will be found that such proportional measuring device are uneconomical because of their difficulty of production and special use. It is therefore proposed that the simple yes-no sensing devices may be mechanically shifted by motor-driven shifting devices generating adjusting signals proportional to the deviation from the predetermined position.

With the apparatus according to the invention and the photocells closely spaced to the laser beam components an accuracy of less than a millimeter of deviation of the measuring points 26 and 36 may be realized without difficulty so that the deviation of the machine 1 from its axis 11 can only be very slight before correction is made. This accuracy may be increased by spacing the first and second sensing means as far as possible from one another in the axial direction of the machine so that a very small displacement of the machine 1 from its axis 11 will be clearly indicated as a lateral displacement from the measuring points 26 and/or 36.

To assure that only actual lateral displacements of the measuring points and the corresponding machine are detected and that for example rotary movement of a boring apparatus would not confuse the control means, there may be provided a third sensing means for measuring and signaling rotary movement of the machine apparatus 1 about an axis 11. As shown in FIG. 1 this means for measuring rotary movement of the apparatus includes a pendulum means 6 pivoted at a point 10 on the apparatus axis 11 and a suitable pendulum movement detecting means 7. As shown, the pendulum 6 maintains its vertical position at all times so that as the apparatus 1 rotates the tip of the pendulum slides on a metal circular arc track 7 in such a way that with minimal friction a sufficient electrical contact is made. A voltage is connected between the two end points 8 and 9 with the midpoint 18 on ground potential so that as the pendulum 6 swings to either side of the midpoint 18 a positive or negative voltage of a magnitude and polarity corresponding to the strength and direction of the turning is transmitted to the pivot point 10. This rotary signal can now be used for the automatic correction of the rotation of the apparatus 1.

This automatic compensation of the angular position of the apparatus 1 is of great importance on those types of working machines wherein this rotary movement is possible since without an immediate compensation for the angular movement, the first and second sensing means 2, 3 would misinterpret the rotary motion as a lateral deviation and attempt to compensate therefor with the result that the apparatus 1 would be thrown off course.

From the above noted description of the invention it will be understood that there has been provided an apparatus guidance system which simply and accurately maintains the position of a machine substantially parallel to a laser beam. A control means mounted on the apparatus and cooperating with the laser beam indicates deviations of the apparatus by means of a first and second sensing means spaced along the laser beam and including photocells that detect relative movement from the laser beam. Where rotary movement of the apparatus may be a factor, a third sensing means is provided to avoid the rotary movement being confused with a lateral movement. It will be understood that the invention is not restricted to the embodiment shown herein, but includes all equivalent means. Thus, where the apparatus absolutely cannot turn on its axis, it is not necessary to provide an automatically correcting rotary measuring device. Moreover, it will be understood that the rotary measuring device may be of any suitable type which functions in the same manner to produce the same results. The photoelectric cells of the embodiment may be photodiodes, photoresistors, or other suitable laser beam detecting means. In addition, while the control means herein has been disclosed for an apparatus which may move in any direction from and about its axis, it will be understood that if the apparatus could only deviate in a single direction but a simplified control system would be adequate to maintain the device on its predetermined path.

Although minor modifications might be suggested by those versed in the art, it should be understood that I wish to embody within the scope of the patent warranted hereon all such modifications as reasonably and properly come within the scope of my contribution to the art.

I claim:

1. An apparatus guidance system comprising a laser beam having a predetermined position, an apparatus having a longitudinal axis adapted to be parallel to said laser beam, a control means mounted on said apparatus and cooperating with said laser beam to indicate deviations of said apparatus axis from a position in which it is parallel to said laser beam whereby the apparatus position may be adjusted to overcome the indicated deviation and return the apparatus to a position parallel with said laser beam, said control means including first and second sensing means positioned in spaced relation along a direction extending parallel to the longitudinal axis of said apparatus and along said laser beam, each of said sensing means producing a separate indication of deviation from the laser beam.

2. An apparatus guidance system according to claim 1 wherein said control means includes a third sensing means measuring rotary movement of said apparatus about said axis.

3. An apparatus guidance system according to claim 1 wherein said laser beam has at least one relatively narrow vertical component and at least one relatively narrow horizontal component, said first and second sensing means each having sensors on opposite sides of each of said horizontal and vertical laser beam components whereby relative vertical or horizontal movement therebetween will be detected.

4. An apparatus guidance system according to claim 3 including a third sensing means measuring rotary movement of the apparatus, said apparatus having a longitudinal axis of rotation parallel to said laser beam, said third sensing means including a pendulum means pivoted on said longitudinal axis of said apparatus and swinging in a plane generally perpendicular to said apparatus whereby rotary movement of said apparatus is detected.

5. An apparatus guidance system according to claim 1 wherein said laser beam is generally in the shape of a cross having horizontal and vertical elements crossing each other, said first and second sensing means each including a vertical sensor and a horizontal sensor, said sensors detecting relative movement with said laser beam.

6. An apparatus guidance system according to claim 5 wherein said crossed horizontal and vertical elements of said laser beam form left and right horizontal portions on opposite sides of said vertical element and upper and lower vertical portions on opposite sides of said horizontal elements, said vertical sensor of said first sensing means including a pair of photoelectric cells on opposite sides of said lower vertical laser beam portion, said horizontal sensor of said first sensing means including a pair of photoelectric cells on opposite sides of said left horizontal portion, said vertical sensor of said second sensing means including a pair of photoelectric cells on opposite sides of said upper vertical portion, said horizontal sensor of said first sensing means including a pair of photoelectric cells on opposite sides of said right horizontal portion.

7. An arrangement for the controlled guidance of an apparatus which travels essentially in the direction of its longitudinal axis, said apparatus being guided by a control means including a laser beam fixed in space and a photosensitive receiver system mounted on said apparatus, said receiver system including two photoreceiver sets spaced along said laser beam and along the direction of the longitudinal axis of the apparatus, said control means measuring the position of two points on said laser beam whereby travel of said apparatus may be accurately guided.

8. An arrangement according to claim 7 wherein the laser beam is fanned open in two planes standing preferably perpendicular to one another to form a fan cross, each of said photoreceiver sets containing at least two photoelectric cells arranged parallel to each plane whereby relative movement between said photoelectric cells and said laser beam will be detected.

9. An arrangement according to claim 8 wherein the photoelectric cells of each photoreceiver set form an L, said two L's supplementing each other to form a rectangle in a projection thereof parallel to the laser beam axis.

* * * * *